United States Patent [19]
Ollis

[11] Patent Number: 5,149,235
[45] Date of Patent: Sep. 22, 1992

[54] NUT

[76] Inventor: Martin G. Ollis, Butlers Leap, Clifton Road Industrial Estate, Rugby, Warwickshire, Great Britain

[21] Appl. No.: 664,879

[22] Filed: Mar. 5, 1991

[30] Foreign Application Priority Data

Mar. 7, 1990 [GB] United Kingdom ................. 9005075

[51] Int. Cl.$^5$ ............................................. F16B 13/04
[52] U.S. Cl. ...................................... 411/41; 411/49; 411/51
[58] Field of Search .................. 411/41, 42, 43, 27, 411/51, 49, 71, 180, 177, 181, 183, 55, 39

[56] References Cited

U.S. PATENT DOCUMENTS

| 1,996,128 | 4/1935 | Thomson | 411/27 |
| 2,120,577 | 6/1938 | Schulte | 411/71 |
| 3,279,303 | 10/1966 | Shackelford et al. | 411/49 |
| 4,483,649 | 11/1984 | Ollis | 411/41 |

FOREIGN PATENT DOCUMENTS

| 245773 | 3/1966 | Austria | 411/51 |
| 1900911 | 11/1969 | Fed. Rep. of Germany | 411/51 |
| 3146995 | 6/1983 | Fed. Rep. of Germany | 411/71 |

Primary Examiner—Rodney M. Lindsey
Attorney, Agent, or Firm—Learman & McCulloch

[57] ABSTRACT

A nut fastener device for a blind hole anchor (FIG. 2) has the nut 14 made frusto-conical with the smallest diameter knurled at 30 and with the largest diameter provided with relieved and back tapered flanks 20. The nut is made integral with a sleeve 10 having flange 12 and a further knurled zone 32, and a sheer zone 16 between the sleeve and nut. During the installation the nut is pulled into the sleeve to expand the sleeve and deform it to the cross sectional shape of the nut so as to provide an angular fix. The sleeve is effectively fixed to the sheet material by the flange on the one side and the deformation of the sleeve on the other side of the sheet. The knurled bands which become axially aligned increase the angular hold of the device in the sheet and of the nut in the sleeve.

3 Claims, 2 Drawing Sheets

NUT

TECHNICAL FIELD

This invention relates to a nut fastener device for a blind hole anchor.

BACKGROUND OF THE INVENTION

Prior patent GB-A-1093714 describes a blind hole anchor nut fastener which comprises a tubular sleeve and a screw threaded nut disposed at the end of the sleeve, the arrangement being such that when a screw threaded mandrel extending through the sleeve and engaged with the nut is displaced axially in the appropriate direction, the nut shears from the sleeve and is drawn into the sleeve in wedging engagement therewith.

Effectively the sleeve is expanded by the nut, and to enable this expansion to take place the nut is generally frusto-conical with its smallest end at the shear point and of a suitable diameter to enter the sleeve.

These anchor nuts are extremely difficult to manufacture satisfactorily. The tolerances are small, because if the nut is made too small relative to the sleeve it will not wedge satisfactory, and if it is made too large the sleeve splits. If the shear point is too weak, nuts may shear as a result of handling in manufacture and transportation, and if the shear point is too strong, shearing will not take place but the sleeve will bell out and be unsatisfactory for that reason.

Satisfactory manufacture is possible, indeed it is believed that nuts of said GB-A-1093714 have been extremely successful commercially but this has only been so because of great care in manufacturing within the prescribed tolerances and with great difficulties in selecting material.

Prior patent EP-071407 solves the above mentioned problem, providing a nut fastener device for a blind hole anchor of the same kind as in the mentioned GB-A-1093714, but having at least one back tapered face which is arcuate about an axis eccentric to that of the sleeve, and provided on the nut. In the preferred arrangement there are a plurality of back tapered faces each arcuate about a separate eccentric axis.

However, certain problems remain even with improved device of the mentioned EP, in particular the angular hold against rotation relies primarily upon the grip afforded to a relatively narrow zone of the sheet material on which the nut is installed, this zone being gripped between a flange on one end of the sleeve abutting one face of the sheet about the hole in which the fastener is installed, and the expanded sleeve on the opposite side of the sheet. If the grip is inadequate the nut can rotate on the sheet.

It is also to be recognized that the illustrations appearing in patent specifications are necessarily greatly enlarged to make the features of construction plain. But in real life a typical nut may be of the order of 5 mm diameter at its maximum, and the annular zone provided by the flange is typically much less than 1 mm in axial dimension, i.e. wide. Consequently the actual surface available for gripping the sheet is minute.

Moreover, the possible taper and back taper may be exaggerated in the drawings of the said European patent for the same kind of reasons. And the actual resistance to rotation of the nut in the sleeve, other than what is due to the frictional effect may well be due to relative eccentricity again of the order of much less than 1 mm. Again then the actual angular hold is dependent upon minute differences in radial dimensions.

Consequently, it is desirable to provide improved means for both the anti-rotational hold of the nut relative to the sleeve and also of the sleeve relative to the installation.

SUMMARY OF THE INVENTION

According to the invention these problems are solved by providing the nut fastener device with two bands of knurling, a first of which is around the nut adjacent the sleeve and the second of which is around the sleeve at the opposite end from the nut, there being a different number of teeth on the two bands.

The first band is effectively forced into contact with the edge of the material in which the fastener is installed, i.e. the perimeter of the hole, when the sleeve is expanded by the nut. The knurls are thereby driven into the sheet and the extend the anti-rotational hold from the face of the sheet to (also) the thickness of the sheet. The second band will be gripped by the sleeve to provided an extra lock in relative rotation.

Preferably a small clearance is provided between the end of the knurling and the shear point on the nut, and a similar clearance at a similar point on the sleeve. Preferably also this clearance has an axial dimension of the order of one half to one third of the thickness of the intended sheet on which the fastener is to be installed, and finally and preferably in this respect the axial dimension of the knurl is of the same order ad the thickness of the sheet. These factors increase the tolerance or range of thicknesses of sheet with which a particular fastener may be installed. They are also thought to improve the axial hold in that the deformation of the shape of the sleeve which occurs upon installation will force the outer of the knurl band across the junction between the edge of the sheet exposed in the hole in the same and the face of the slit adjacent the nut. These points will be more particularly illustrated in the following description.

The two bands will be axially aligned with one another and with the said sheet material, thus concentrating the efforts and using the sheet material to hold the engagement—which is in contrast to the grip afforded by the compression of the sheet material between the flange and sleeve where slight relaxation of the axial positioning of the sleeve loosens the grip of the fastener on the sheet. When the grip is due to the knurls embedding in the sheet in a direction radial to the axis of the fastener, such loosening may even become impossible.

By choosing knurl tooth numbers which are different, excessive thinning of the material around the entire circumferential length of the sleeve is avoided. For if the same number of teeth were provided on both parts, the embedment could, if the teeth radially coincided (and their locations is a random matter) result in the apex of a tooth on one band being aligned with the apex of a tooth on the other band with possibly an extremely small dimension of material remaining between the two aligned teeth. By using different tooth numbers, it is ensured that although such condition applies at one angular position, the converse applies and there is maximum wall dimension between the teeth at a different angular position. Preferably the tooth numbers differ by the same number as the number of back tapered faces, typically three, in which case there will be three equispaced angular locations where maximum wall thickness remains.

The invention is more particularly described with reference to the accompanying drawings.

DETAILED DESCRIPTION OF THE INVENTION

Figure 1:
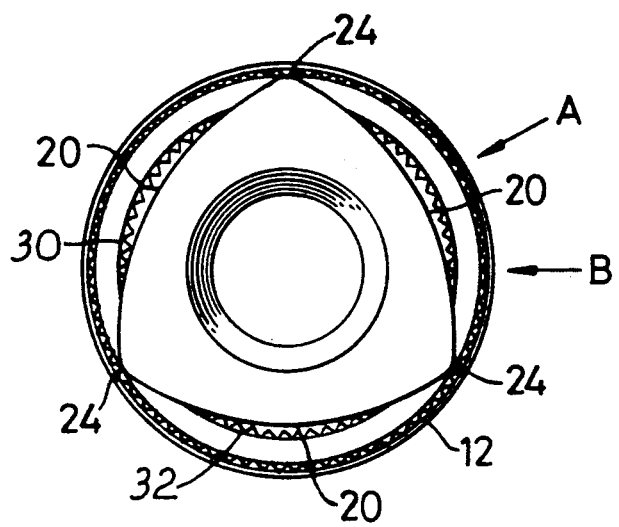
FIG. 1 is a plan view of the device.
Figure 2:
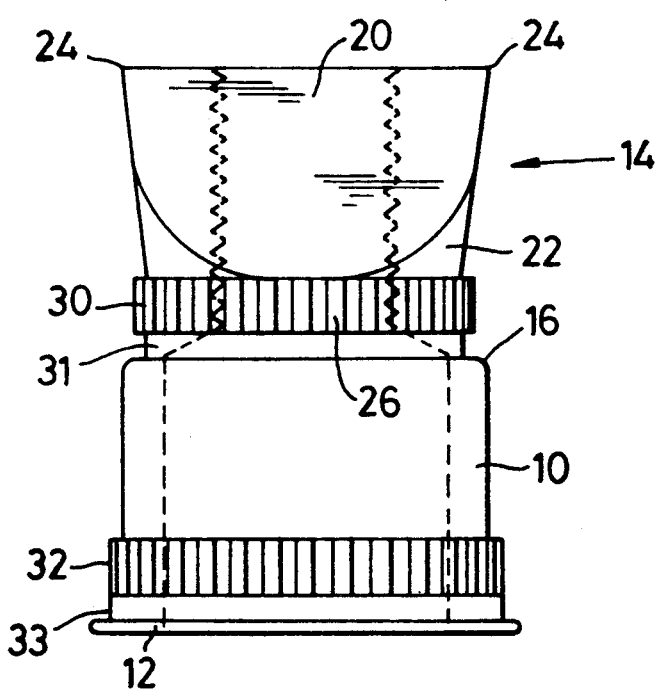
FIG. 2 is a side elevation of the same.

The fastener device shown in the drawings comprises a tubular sleeve 10 having a slight lip 12 at one end and provided with an integral nut 14 at the opposite end. The nut is connected to the sleeve by a shear zone 16. Portion 22 is initially made frusto-conical and then machine off at 20 to leave three back tapered flanks or faces. Hence points 24 lie on the largest diameter of the original frusto-cone.

Alternatively, instead of making a frusto-cone and then machine it, the final complex shape can be made by cold forming or other techniques.

According to the invention, two bands of knurled teeth are provided namely band 30 which may comprise for example twentyfive teeth, and band 32 which may have twentytwo teeth. The numbers will depend upon the nature of the knurl tool used to form those teeth and the number will also be selected bearing in mind the actual size of the fastener. Thus a 2BA fastener will normally bear more teeth than a 6BA fastener. The knurl band 30 is spaced from the zone 16 by a clearance 31 which is of an axial length about one third or one half of the axial length of the knurl band 30 and the latter is similar to the anticipated thickness of the sheet on which the fastener is to be installed. A similar clearance 33 exists between the knurl band 32 and the lip 12 and the knurl band 32 is of like axial (but not diametric) dimensions to the band 30.

The band 33 may be of the same diameter as the maximum diameter of the knurled zone 32. The band 31 may be of the same diameter as the root diameter of the knurled band 30.

The knurling operation which forms the teeth involves displacement of material radially outwardly of the original body and forming recesses radially inwardly of the original body. It is effected by rotating the fastener for example in a lathe whilst a knurling wheel presses against the fastener. But alternative manufacturing methods can be employed.

Figure 3:
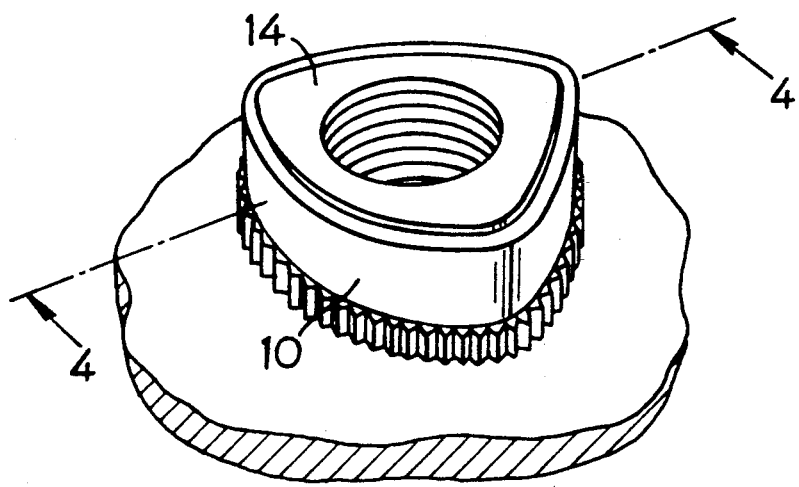
FIG. 3 is a perspective view showing the same installed.
Figure 4:
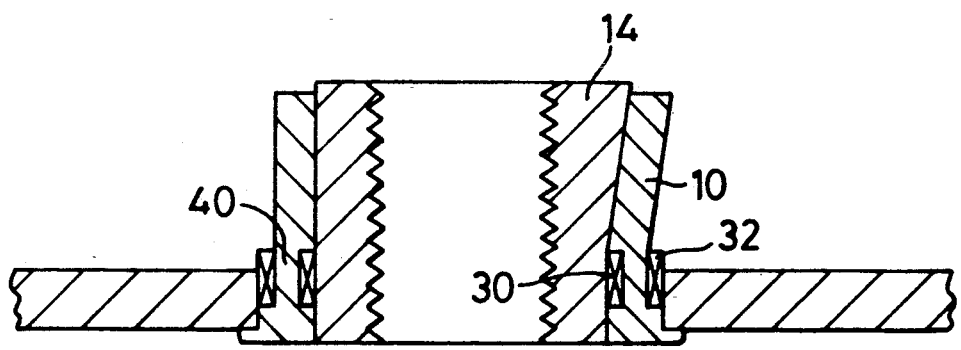
FIG. 4 is a section on the line 4—4.

The wall thickness of the sleeve at the point 40. FIG. 4 is that of the original sleeve wall as modified first by the knurling operation to produce the teeth 32, which will cause that thickness to increase to a maximum opposite the crest of each outwardly projecting tooth and a minimum between each two teeth, and hence with twentyfive teeth in the band 32 there will be twentyfive points of maximum thickness alternating with twentyfive points of minimum thickness. However, when the nut has been installed as in FIGS. 3 and 4, the teeth 30 embed into the wall and where the tip of one of the teeth of the band 30 is radially aligned with one of the minimum thickness portions of the sleeve, the thickness is further reduced at that point. As mentioned, the effect of using different tooth numbers is to avoid the possibility of such thickness being uniformly reduced at a position adjacent each of the teeth.

I claim:

1. A nut fastener device for a blind hole anchor comprising a tubular sleeve and screw threaded nut disposed at the end of the sleeve, the nut having frusto-conical surface portions with a maximum diameter at the end of the nut remote from the sleeve and a minimum diameter at the end nearest the sleeve, the frusto cone being co-axial with the sleeve, and the arrangement being such that when the device is entered into a blind hole and a screw threaded mandrel is passed through the sleeve and engaged with the nut and then displaced axially in the appropriate direction, the nut is drawn into the sleeve thereby expanding the sleeve and wedging the nut in the sleeve, the nut having at least one back tapered face which is arcuate about an axis eccentric to that of the sleeve, and there being two bands of exterior teeth applied, a first of which is around the nut adjacent the sleeve and the second of which is around the sleeve at the opposite end from the nut, the teeth of the band on the sleeve being fewer in number than the teeth of the band on the nut and the difference in the number of teeth of the two bands corresponding to the number of said tapered faces.

2. A nut fastener device according to claim 1 wherein the difference in the number of teeth of the two bands is three.

3. A nut fastener device according to claim 1 wherein the teeth project radially to the exterior of the sleeve and the nut, respectively.

* * * * *